Figure 1:
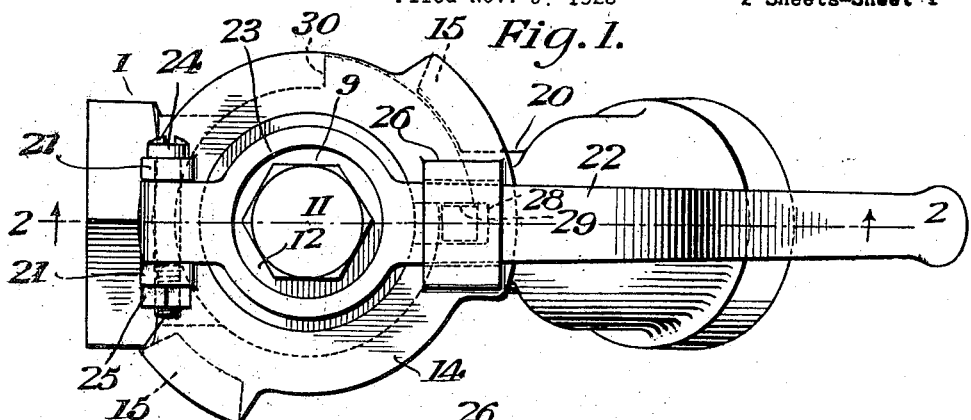

July 15, 1924.

S. G. NEAL

ANGLE COCK

Filed Nov. 9, 1923

1,501,063

2 Sheets-Sheet 1

INVENTOR
*Spencer G. Neal*
BY
ATTORNEYS

July 15, 1924.

S. G. NEAL

ANGLE COCK

Filed Nov. 9, 1923

1,501,063

2 Sheets-Sheet 2

INVENTOR
Spencer G. Neal
BY
ATTORNEYS

Patented July 15, 1924.

1,501,063

UNITED STATES PATENT OFFICE.

SPENCER G. NEAL, OF NEW YORK, N. Y., ASSIGNOR TO AUTOMATIC STRAIGHT AIR BRAKE COMPANY, OF WILMINGTON, DELAWARE, A CORPORATION OF DELAWARE.

ANGLE COCK.

Application filed November 9, 1923. Serial No. 673,749.

*To all whom it may concern:*

Be it known that I, SPENCER G. NEAL, a citizen of the United States, and residing in the borough of Manhattan, city, county, and State of New York, have invented certain new and useful Improvements in Angle Cocks (Case No. 50), of which the following is a specification.

This invention relates to improvements in that class of valves known as angle cocks and used principally in the brake pipe of an air brake apparatus. The commercial form of these valves, and the form almost exclusively used on railroads of the country, comprises a casing adapted to be connected to the brake pipe and enclosing a tapered plug valve. The plug is arranged with the smaller end uppermost and an operating handle is connected to said smaller upper end. The operating handle is placed parallel with the brake pipe and the valve casing in order to place the valve in open position and is adapted to be arranged at right angles to the brake pipe to close the valve. It is the common practice to provide means for locking the handle and the valve in the open and in the closed positions.

By reason of the fact that the valve is arranged with its smaller end uppermost pressure applied to the upper end of the valve will unseat it. It is common practice among trainmen to use the angle cock casing as a step. It is manifest therefore that by stepping on the upper end of the ordinary plug type of angle cock the valve will be depressed and unseated thereby permitting the escape of air from the brake pipe. The unseating of the plug valve also permits dirt and grit, and sometimes water or snow, to enter between the plug and its seat. All of these things interfere with the proper operation of the valve and, of course, dirt and grit will prevent the plug valve properly reseating when the pressure is removed from the upper end thereof.

Many devices have been devised to prevent pressure being applied to the upper end of the plug valve, these devices usually being in the form of guards which extend above the upper end of the plug valve and on which the trainmen will step, said guard preventing the weight of the trainman from reaching the plug valve.

It is also common practice to connect the operating handle to the projecting upper end of the plug valve so that the strain of rotating the plug valve by means of the handle tends to cant the plug valve on its seat so that the wear between the plug valve and its seat is unevenly distributed. This tends to wear the valve unevenly on opposite sides and results in frequent regrinding of the valve in order to keep it in its true tapered form.

It has been found to be practically impossible to construct the plug valve and the pressure guards with sufficient accuracy to prevent the plug valve unseating. If there is any play in the parts a downward pressure applied to the guards will unseat the valve. This is due to the fact that the plug valve is upwardly tapered and that all of the protecting means is rigidly connected to the upper end of the plug, and if there is any play between said means and the upper surface of the valve casing a downward pressure will force the valve from its seat. It is also true that even if the plug valve is originally made with extreme accuracy any regrinding of the valve or any wear on the plug valve will produce sufficient play to permit the valve to be unseated by a pressure on its upper end. It must be kept in mind that as the plug valve wears its retaining spring forces it upwardly in its tapered bearing, this upward movement taking up the wear on the plug and on its bearing. Any upward movement of the plug lifts the operating mechanism and the guard device above the valve casing, and, as hereinbefore stated, any play between the operating mechanism and the valve casing will permit the valve to be unseated by a downward pressure on the guard.

One of the principal objects of this invention is to provide an angle cock of the plug type wherein the plug valve will be arranged with its larger end uppermost, whereby it will be unnecessary to provide means to prevent the unseating of the valve.

Another important object of the invention is to provide an angle cock of the plug type wherein the operating handle will be mounted on the upper side of the valve casing but will be connected to the lower projecting end of the valve plug below the valve casing, whereby any downward pressure applied to the handle will not tend to unseat the valve.

Another important object of the invention is to provide means whereby the operating handle will be connected to the projecting end of the valve plug on substantially opposite sides of the plug whereby the strain of rotating the plug will be applied evenly and without any tendency to cant the plug on its seat.

Another object of the invention is to so construct the plug valve and its operating means that there will be no rigid connections between the parts, whereby the valve will be self seating at all times and whereby any wear on the valve or its bearing may be automatically taken up without in any way affecting or varying the operation of the valve or changing the position of the valve operating parts.

Another important object of the invention is to provide an angle cock which may be readily and easily manipulated and which may be locked in its open or closed position.

Another object of the invention is to simplify and improve the construction of angle cocks in such manner that the parts may be readily and cheaply manufactured and easily and quickly assembled.

Figure 2:
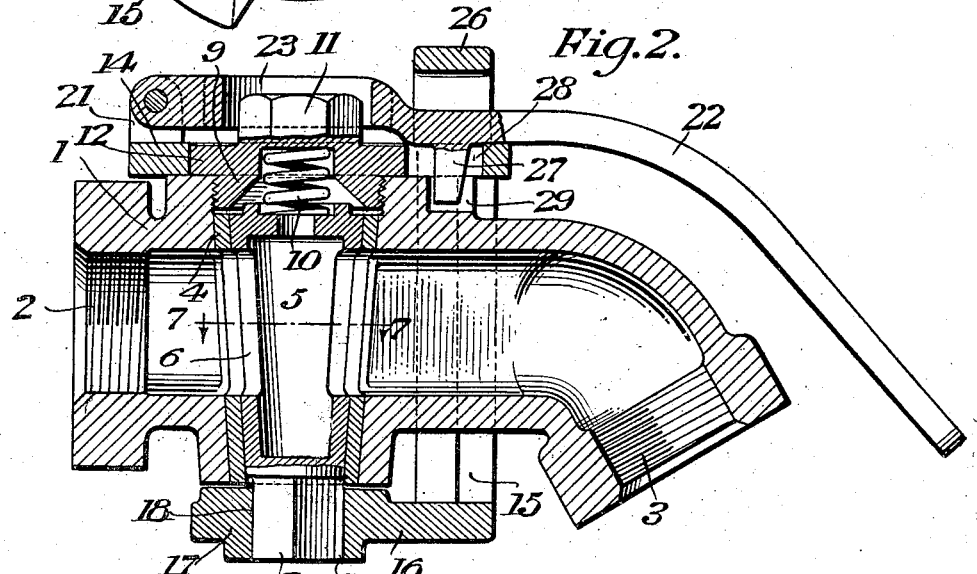
Figure 3:
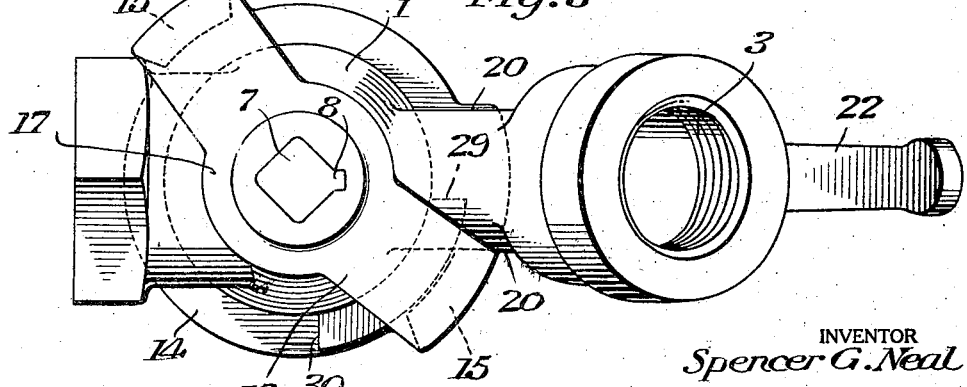
Figure 4:
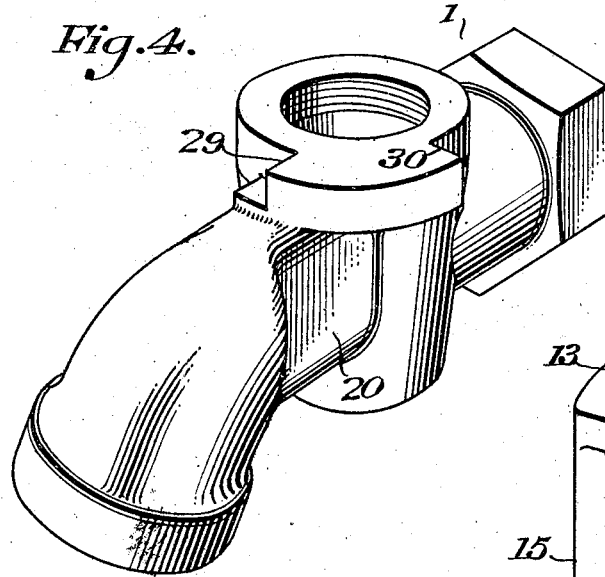
Figure 5:
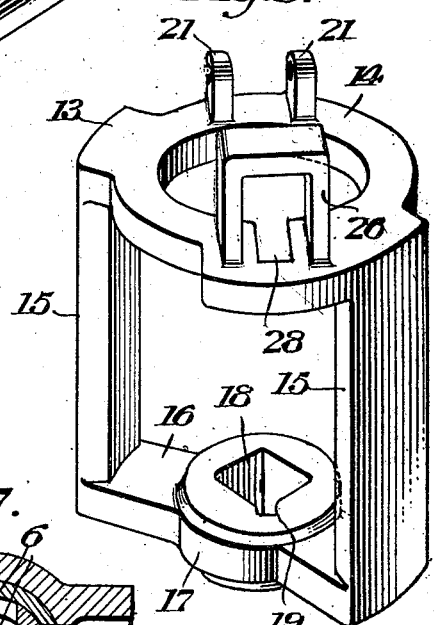
Figure 6:
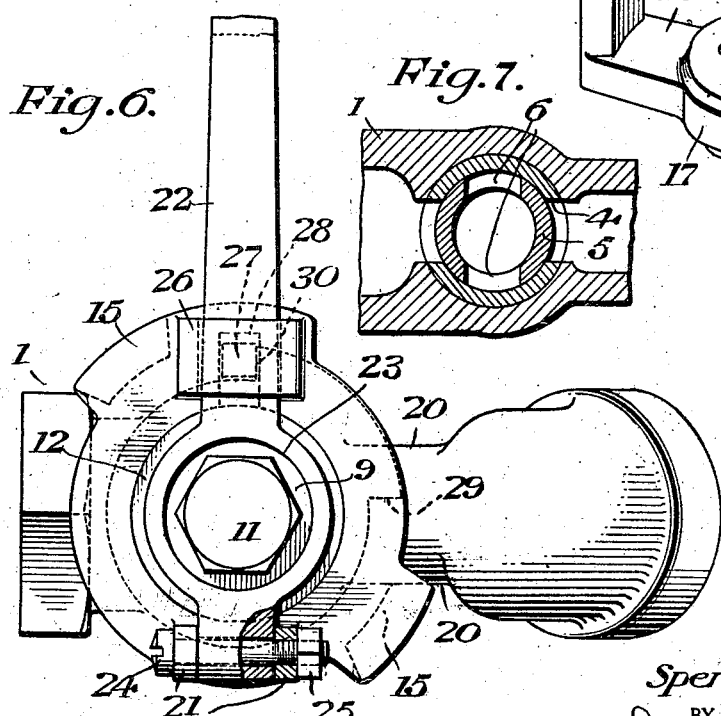

In the drawings:

Fig. 1 is a plan view of the angle cock complete with the handle in open position;

Fig. 2 a longitudinal vertical sectional view on the line 2—2 of Fig. 1;

Fig. 3 a bottom plan view of the device complete;

Fig. 4 a perspective view of the valve casing;

Fig. 5 a perspective view of the valve operating member which connects the handle to the plug valve;

Fig. 6 a plan view of the angle cock with the handle in closed position; and

Figure 7:
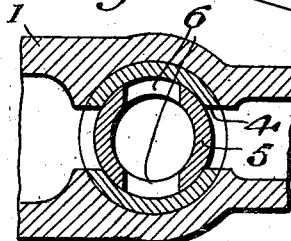

Fig. 7 a detail sectional view on the line 7—7 of Fig. 2 showing the valve in closed position.

Referring to the various parts by numerals, 1 designates a valve casing which is provided at one end with a threaded connection 2 for the brake pipe, and at its other end with a downwardly turned connection 3. To this latter connection is secured the end of the ordinary connecting hose commonly used for connecting together the sections of the brake pipe between the cars of a train. The valve casing is formed with the usual longitudinal air passage and with a downwardly tapered seat which is adapted to receive the downwardly tapered valve bushing 4, said bushing being apertured co-incident with the air passage in the valve casing. Fitted in the bushing is a downwardly tapered plug valve 5, said valve being provided with a transverse aperture 6 which, when the valve is in open position, registers with the air passage through the bushing and the valve casing. The lower end of the bushing 4 is open and is substantially flush with the lower surface of the valve casing, as shown clearly in Fig. 2. The lower end of the plug valve is closed and is provided with an angular downwardly projecting stem 7. Said stem is preferably rectangular and is provided with a longitudinally extending assembly key 8 along one vertical edge in order that when the parts of the device are assembled the position of the plug valve will be indicated by the key. The bushing and the plug valve are introduced into the casing through a large aperture in the upper end of the valve casing and this aperture is closed by a screw plug 9, said plug being internally raised to receive a coil spring 10. Said spring is slightly compressed by the closure plug and bears, at its lower end, on the upper end of the plug valve and yieldingly forces it down to its seat. This screw plug 9 is formed with a wrench receiving part 11 and with a large circular flange 12 which seats firmly on the upper surface of the valve casing, as shown clearly in Fig. 2. It is manifest that the plug valve is completely enclosed in the valve casing, except for its projecting lower end, and that it will automatically maintain its seat in its bushing.

It is also clear that no amount of pressure applied to the closure plug or to the upper part of the valve casing will have any effect upon the plug valve. It is also clear that the closure plug 9 will completely seal the upper end of the valve casing and prevent the entrance of moisture or grit so that the valve and its bushing will always be free and clear and accurately fitted.

Rotatably mounted upon the upper surface of the valve casing is a valve operating member 13. This valve operating member comprises an upper ring-like plate 14 which fits closely around the circular flange 12 of the closure plug and is adapted to rotate around said flange in contact with the upper surface of the valve casing and in contact with the vertical edge of said flange. Extending downwardly from the plate 14 at substantially diametrically opposite points are two vertical arms 15, said arms being preferably cast integral with the plate 14. The lower end of the arms 15 are connected together by a horizontal transverse arm 16 in the center of which is formed a boss or hub 17. Through the hub 17 is formed a central vertical angular opening 18 adapted to freely receive the downwardly extending angular stem formed on the lower end of the plug valve 5. The hub 17 is also formed with a vertical key-way 19 to receive the assembly key 8 of the plug valve. The upper surface of the hub 17 is arranged close to the lower surface of the valve casing so that when the parts are assembled there will be a very slight, if any, upward movement of the valve operating member. The arms 15 are not arranged at diametrically opposite points, but are slightly offset as shown clearly in Figs. 1, 2 and 5 so that they may contact with the sides of the valve casing and thereby limit the turning movement of the plug valve to its closed and open positions. These arms and the valve casing form stops to limit the movement of the plug valve as will be hereinafter described. As shown in the drawings the sides of the valve casing are flattened, as at 20, to adapt them to be engaged by the sides of the arms 15 and to thereby stop the plug valve in its proper position. If desired both of the arms 15 may be adapted to engage the sides of the valve casing so as to distribute the shock. As shown in the drawings one of the arms 15 will engage one of the flattened sides 20 of the valve casing, the other arm engaging the inclined wrench receiving flange of the casing at the brake pipe connection 2. By this arrangement the plug valve may be swung to its open or closed position and the shock of the contact of the valve operating member with its stops will be evenly and nicely distributed throughout the valve operating member and without any tendency to cant or upset the plug valve on its seat, the said valve being maintained in its true vertical position in its bushing. As shown clearly in Fig. 2 of the drawings the tapered portion of the plug valve body terminates slightly above the upper surface of the hub 17 so that the said plug has ample room to move downwardly to maintain its seat and working fit in its bushing without disturbing the relation of the plug valve with the operating member. This permits the valve to automatically seat itself and to take up for wear.

The upper ring-like plate 14 of the valve operating member is provided with two upstanding pivot lugs 21 between which the rear end of the operating handle 22 is pivoted, said handle extending forwardly over the closure plug, the operating end thereof curving downwardly and following substantially the curvature of the hose connection end 3 of the valve casing. The handle, directly over the closure plug 9, is enlarged, and this enlarged portion is formed with a central vertical aperture 23 to receive the wrench receiving portion 11 of the closure plug. The handle is connected to the pivot lugs 21 by means of a screw pin 24, said pin being locked in position by a nut 25. Formed on the plate 14 diametrically opposite the pivot lugs 21 is an upstanding closed arch or strap 26 through which the handle loosely extends. The handle, directly below the arch 26, is provided with a downwardly extending locking lug 27 which is adapted to pass downwardly through an open slot 28 formed in the plate 14. The lug 27 extends below the upper surface of the valve casing and is adapted to engage locking shoulders 29 and 30 formed thereon. These two locking shoulders and the locking lug 27 cooperate with the arms 15 of the valve operating member to lock the plug valve in its open and closed positions. The locking shoulder 29 is arranged to be engaged by the locking plug 27 when the handle extends longitudinally of the valve casing as shown in Figs. 1 and 2 to lock the valve in its open position. The shoulder 30 is adapted to be engaged by the lug 27 when the operating handle is transverse of the valve casing, as shown in Fig. 6, to lock the plug valve in its closed position. The arch 26 is of sufficient height to permit the handle to be lifted to free the locking lug 27 from the locking shoulders 29 and 30.

The parts of the device are assembled as follows:

The valve operating member is first placed in position by passing it up over the hose connection end 3 of the valve casing. The plug valve is then dropped down through the ring-like plate or member 14 and into the valve casing, the lower angular end of the plug entering the angular socket 18 of the operating member and the assembly key 8 fitting in the key-way 19. This places the valve in its open position as illustrated in Fig. 2. The spring 10 is then placed on top of the valve and the closure plug 9 screwed into the threaded aperture in the upper part of the valve casing. The handle 22 is then passed forwardly through the arch 26, and the rear end of the handle is then secured between the pivot lugs by the screw pin 24. To disconnect the parts the pivot pin 24 is first removed thereby permitting the rear end of the handle to be raised and the handle withdrawn rearwardly through the arch 26. The screw closure plug 9 may then be removed and the plug valve lifted from the valve casing. The valve operating member is then free to be removed from the valve casing over the hose connection end 3.

As shown in Figs. 1 and 2 the plug valve is in its open position. The handle 22 extends longitudinally of the valve casing and the lug 27 thereon is in engagement with the locking shoulder 29. The arms 15 of the valve operating member are in engagement with the sides of the valve casing. To turn the valve to its closed position the handle 22 is raised to free the lug 27 from the locking shoulder 29. Ordinarily it will be lifted to the limit of the arch 26. The handle is then turned counter-clock-wise to bring it to the position shown in Fig. 6. The side-wise strain on the handle will bring it into engagement with one of the side walls of the arch 26, the pivotal connection of the handle being sufficiently loose to permit this without binding. The arms 15 engaging the sides of the valve casing will stop the handle in this position. It is then only necessary to drop the handle to permit the lug 27 to engage the locking shoulder 30. In this position of the parts the valve is locked closed. To return the valve to its open position it is only necessary to lift the handle and turn it back to the position shown in Fig. 1 and to then permit the handle to drop so that the lug 27 will again engage the locking shoulder 29. It is to be noted that the arms 15 serve as means to stop the handle and the valve in both their open and closed positions.

It is clear that no pressure can be exerted on the plug valve which would have a tendency to unseat it. It is also clear that by causing the handle 22 to engage the valve operating member at two points on opposite sides of the axis of the valve there will be no tendency to cant the valve on its seat and the turning pressure will be equally and directly applied to turn the valve on its axis.

What I claim is:

1. In a valve device the combination of a valve casing, a rotative valve therein and extending beyond one side of the casing, a valve operating member extending around the casing and connected to the projecting end of the valve, a handle connected to the valve operating member on the opposite side of the valve casing from the connection between the valve and said valve operating member, and means for locking the handle to hold the valve in open or closed position.

2. In a valve device, the combination of a valve casing, a rotative tapered plug valve therein the smaller end of said valve extending beyond one side of the casing, a valve operating member extending around the casing and connected to the projecting end of the valve, a handle connected to the valve operating member on the opposite side of the valve casing from the connection between the smaller end of the valve and said valve operating member, and means for locking the handle to hold the valve in open or closed position.

3. In a valve device, the combination of a valve casing, a rotative downwardly tapered valve plug therein the smaller end of said plug extending beyond the lower side of the casing and formed with an angular extension, a valve operating member extending around the casing the upper portion of said member bearing on the upper surface of the valve casing and the lower portion of said member being formed with an angular socket to receive the angular extension on the lower end of the valve plug, a handle pivoted to the upper portion of the valve operating member above the top of the valve casing whereby the valve operating member and the plug valve may be rotated by said handle, and means for locking the handle to hold the valve in open or closed position.

4. In a valve device, the combination of a valve casing, a rotative downwardly tapered valve plug therein the smaller end of said plug extending beyond the lower side of the casing and formed with an angular extension, a valve operating member extending around the casing the upper portion of said member bearing on the upper surface of the valve casing and the lower portion of said member being formed with an angular socket to receive the angular extension on the lower end of the valve plug, a handle pivoted to the upper portion of the valve operating member above the top of the valve casing whereby the valve operating member and the plug valve may be rotated by said handle, means carried by the valve operating member to limit the rotation of said member to stop the valve in its open or closed positions, and means for locking the handle to hold the valve in open or closed position.

5. In a valve device, the combination of a valve casing formed with a downwardly tapered valve receiving aperture, a rotative downwardly tapered valve plug therein the small end of said plug extending beyond the lower side of the casing and formed with an angular extension, a closure plug secured in the upper end of the valve casing and formed with a circular bearing flange engaging the upper surface of said casing, a valve operating member extending around the casing the upper portion of said member bearing on the upper surface of the valve casing and fitting snugly around the circular flange of the closure plug and the lower portion of said member being formed with a socket to receive the extension on the end of the valve plug, a handle pivoted to the upper portion of the valve operating member above the top of the valve casing, means carried by the valve operating member to limit the rotation of said member to stop the valve in its open or closed positions, and means for locking the handle to hold the valve in open or closed position.

6. In a valve device, the combination of a valve casing, a rotative valve therein and extending beyond one side of the casing, a valve operating member extending around the casing and connected to the projecting end of the valve, a handle connected to the valve operating member on the opposite side of the valve casing from the connection between the valve and said valve operating member, and means for locking the valve operating member to hold the valve in open or closed position.

7. In a valve device, the combination of a valve casing, a rotative tapered plug valve therein the smaller end of said valve extending beyond one side of the casing, a valve operating member extending around the casing and connected to the projecting end of the valve, a handle connected to the valve operating member on the opposite side of the valve casing from the connection between the smaller end of the valve and said valve operating member, and means for locking the valve operating member to hold the valve in open or closed position.

8. In a valve device, the combination of a valve casing, a rotative downwardly tapered valve plug therein the smaller end of said plug extending beyond the lower side of the casing and formed with an angular extension, a valve operating member extending around the casing the upper portion of said member bearing on the upper surface of the valve casing and the lower portion of said member being formed with an angular socket to receive the angular extension on the lower end of the valve plug, a handle pivoted to the upper portion of the valve operating member above the top of the valve casing whereby the valve operating member and the plug valve may be rotated by said handle, and means for locking the valve operating member to hold the valve in open or closed position.

9. In a valve device, the combination of a valve casing, a rotative downwardly tapered valve plug therein the smaller end of said plug extending beyond the lower side of the casing and formed with an angular extension, a valve operating member extending around the casing the upper portion of said member bearing on the upper surface of the valve casing and the lower portion of said member being formed with an angular socket to receive the angular extension on the lower end of the valve plug, a handle pivoted to the upper portion of the valve operating member above the top of the valve casing whereby the valve operating member and the plug valve may be rotated by said handle, means carried by the valve operating member to limit the rotation of said member to stop the valve in its open or closed positions, means for locking the handle to hold the valve in open or closed position, means carried by the valve operating member and adapted to engage the valve casing to stop the valve in its open or closed positions, and means for locking the valve operating member to hold the valve in its open or closed positions.

10. In a valve device, the combination of a valve casing formed with a downwardly tapered valve receiving aperture, a rotative downwardly tapered valve plug therein the small end of said plug extending beyond the lower side of the casing and formed with an angular extension, a closure plug secured in the upper end of the valve casing and formed with a circular bearing flange engaging the upper surface of said casing, a spring interposed between the closure plug and the upper end of the valve plug, a valve operating member extending around the casing the upper portion of said member bearing on the upper surface of the valve casing and fitting snugly around the circular flange of the closure plug and the lower portion of said member being formed with a socket to receive the extension on the end of the valve plug, a handle pivoted to the upper portion of the valve operating member above the top of the valve casing, means carried by the valve operating member to limit the vertical and lateral movements of the handle, means carried by the valve operating member to limit the rotation of said member to stop the valve in its open or closed positions, and means for locking the handle to hold the valve in open or closed position.

11. In a valve device, the combination of a valve casing, a rotative downwardly tapered valve plug therein the smaller end of said plug extending beyond the lower side of the casing and formed with an angular extension, a valve operating member extending around the casing the upper portion of said member bearing on the upper surface of the valve casing and the lower portion of said member being formed with an angular socket to receive the angular extension on the lower end of the valve plug, a handle pivoted to the upper portion of the valve operating member above the top of the valve casing whereby the valve operating member and the plug valve may be rotated by said handle, means carried by the valve operating member to limit the rotation of said member to stop the valve in its open or closed positions, means carried by the valve operating member to limit the vertical and lateral movement of the handle, and means for locking the handle to hold the valve in open or closed position.

12. In a valve device, the combination of a valve casing formed with a downwardly tapered valve receiving aperture, a rotative downwardly tapered valve plug therein the small end of said plug extending beyond the lower side of the casing and formed with an angular extension, a closure plug secured in the upper end of the valve casing and formed with a circular bearing flange engaging the upper surface of said casing, a spring interposed between the closure plug and the upper end of the valve plug, a valve operating member extending around the casing the upper portion of said member bearing on the upper surface of the valve casing and fitting snugly around the circular flange of the closure plug and the lower portion of said member being formed with a socket to receive the extension on the end of the valve plug, two vertical arms connecting the said upper portion with the said lower portion of the valve operating member at substantially diametrically opposite points, a handle pivoted to the upper portion of the valve operating member above the top of the valve casing, means carried by the valve operating member to limit the vertical and lateral movements of the handle, and means for locking the handle to hold the valve in open or closed position.

13. In a valve device, the combination of a valve casing formed with a downwardly tapered valve receiving aperture, a rotative downwardly tapered valve plug therein the small end of said plug extending beyond the lower side of the casing and formed with an angular extension, a closure plug secured in the upper end of the valve casing and formed with a circular bearing flange engaging the upper surface of said casing, a spring interposed between the closure plug and the upper end of the valve plug, a valve operating member extending around the casing the upper portion of said member bearing on the upper surface of the valve casing and fitting snugly around the circular flange of the closure plug and the lower portion of said member being formed with a socket to receive the extension on the end of the valve plug, two vertical arms connecting the said upper portion with the said lower portion of the valve operating member at substantially diametrically opposite points, a handle pivoted to the upper portion of the valve operating member above the top of the valve casing, means carried by the valve operating member to limit the vertical and lateral movements of the handle, the vertical arms of the operating member serving as means to limit the rotation of said member to stop the valve in its open or closed positions, and means for locking the handle to hold the valve in open or closed position.

14. In a valve device, the combination of a valve casing formed with a downwardly tapered valve receiving aperture, a rotative downwardly tapered valve plug therein the small end of said plug extending beyond the lower side of the casing and formed with an angular extension, a closure plug secured in the upper end of the valve casing and formed with a circular bearing flange engaging the upper surface of said casing, a spring interposed between the closure plug and the upper end of the valve plug, a valve operating member extending around the casing the upper portion of said member bearing on the upper surface of the valve casing and fitting snugly around the circular flange of the closure plug and the lower portion of said member being formed with a socket to receive the extension on the end of the valve plug, a handle pivoted to the upper portion of the valve operating member above the top of the valve casing, means carried by the valve operating member to limit the vertical and lateral movements of the handle, means carried by the valve operating member to limit the rotation of said member to stop the valve in its open or closed positions, and a locking lug formed on the handle and adapted to engage locking shoulders formed on the valve casing to lock the valve in its open or closed position.

15. In a valve device, the combination of a valve casing, a rotative valve therein and extending beyond one side of the casing, a valve operating member extending around the casing and connected to the projecting end of the valve, a handle connected to the valve operating member on the opposite side of the valve casing from the connection between the valve and said valve operating member, and a locking lug formed on the handle and adapted to engage locking shoulders formed on the valve casing to lock the valve in its open or closed positions.

16. In a valve device, the combination of a valve casing formed with a downwardly tapered valve receiving aperture, a rotative downwardly tapered valve plug therein the small end of said plug extending beyond the lower side of the casing and formed with an angular extension, a closure plug secured in the upper end of the valve casing and formed with a circular bearing flange engaging the upper surface of said casing, a spring interposed between the closure plug and the upper end of the valve plug, a valve operating member extending around the casing the upper portion of said member bearing on the upper surface of the valve casing and fitting snugly around the circular flange of the closure plug and the lower portion of said member being formed with a socket to receive the extension on the end of the valve plug, two vertical arms connecting the said upper portion with the said lower portion of the valve operating member at substantially diametrically opposite points, a handle pivoted to the upper portion of the valve operating member at one side of the axial center of the plug valve, a rigid arch carried by the valve operating member and extending over the handle said arch being diametrically opposite the pivot point of the lever, and means for locking the handle to hold the valve in open or closed position.

17. In a valve device, the combination of a valve casing formed with a downwardly tapered valve receiving aperture, a rotative downwardly tapered valve plug therein the small end of said plug extending beyond the lower side of the casing and formed with an angular extension, a closure plug secured in the upper end of the valve casing and formed with a circular bearing flange engaging the upper surface of said casing, a spring interposed between the closure plug and the upper end of the valve plug, a valve operating member extending around the casing the upper portion of said member bearing on the upper surface of the valve casing and fitting snugly around the circular flange of the closure plug and the lower portion of said member being formed with a socket to receive the extension on the end of the valve plug, two vertical arms connecting the said upper portion with the said lower portion of the valve operating member at substantially diametrically opposite points, a handle pivoted to the upper portion of the valve operating member at one side of the axial center of the plug valve, a rigid arch carried by the valve operating member and extending over the handle said arch being diametrically opposite the pivot point of the lever, and a locking lug on the handle and adapted to engage locking shoulders formed on the valve casing to lock the valve in its open or closed positions.

In testimony whereof I hereunto affix my signature.

SPENCER G. NEAL.